Dec. 26, 1933.   S J. HELLMAN   1,941,089
SAFETY DEVICE
Filed Aug. 16, 1932
Fig. 1
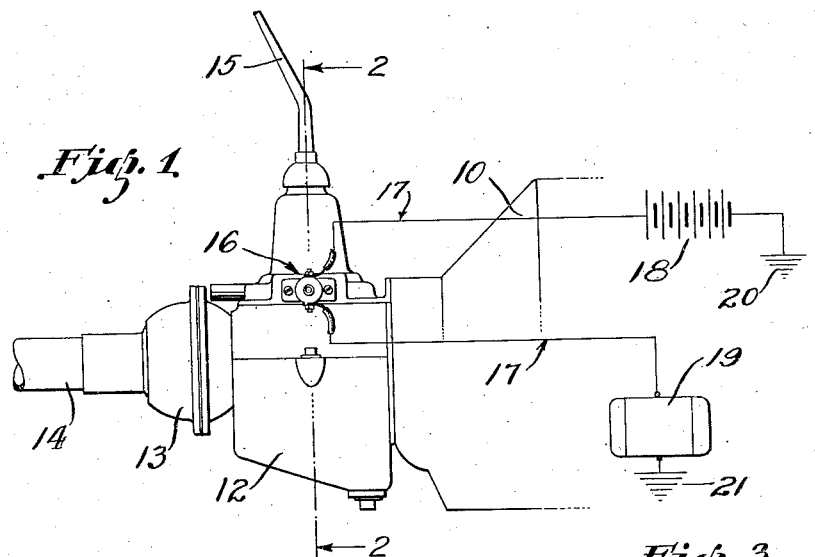
Fig. 2
Fig. 3
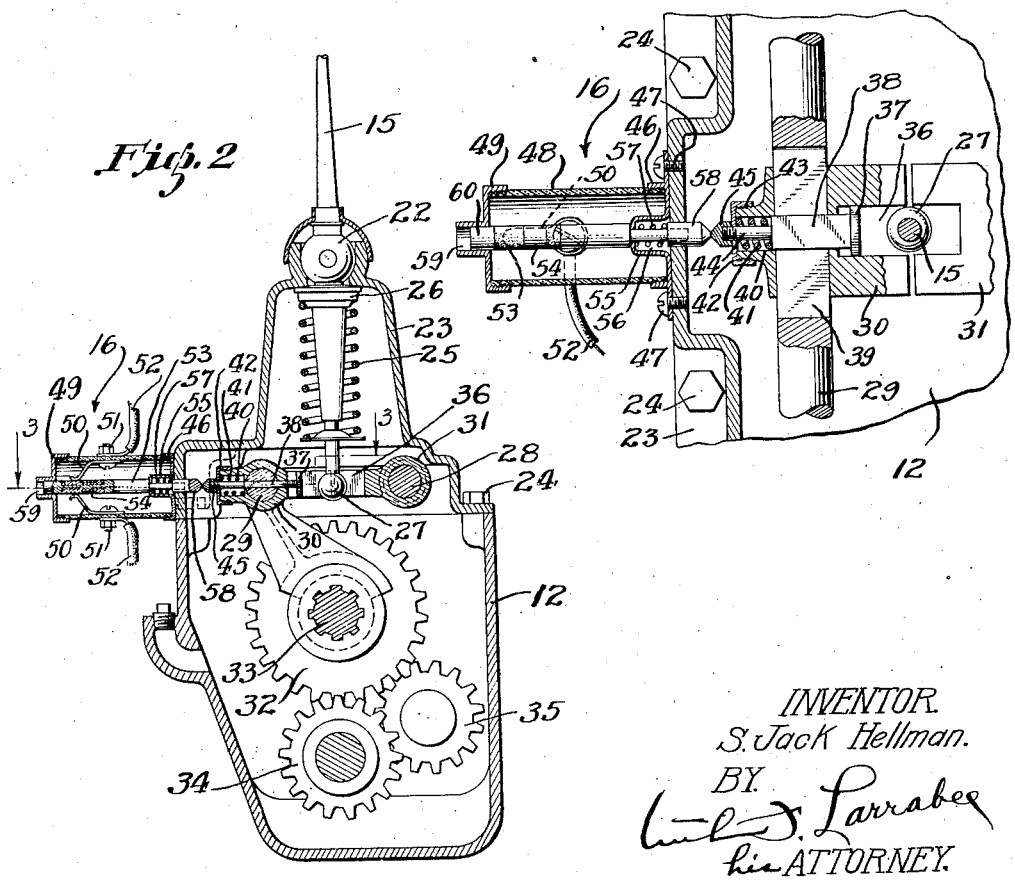
INVENTOR.
S. Jack Hellman.
BY
his ATTORNEY.

Patented Dec. 26, 1933

1,941,089

UNITED STATES PATENT OFFICE 1,941,089

SAFETY DEVICE

S Jack Hellman, Los Angeles, Calif.

Application August 16, 1932. Serial No. 628,965

11 Claims. (Cl. 290—28)

This invention relates to a safety device for automobiles and more particularly to a safety device adapted to be operated only when the gear shift lever of a motion transmission means is in neutral position to thereby prevent accidental movement of the automobile by starting the engine thereof when in gear.

An object of this invention is to provide novel means of mounting and operating a starter switch for automobiles and which can only be operated when the gears of the automobile transmission are in neutral.

An object is to provide novel means whereby in automobiles a starter switch is so related to the gear shift lever that when the gear shift lever is locked in gear position the switch cannot be operated to start the motor.

Another object is to provide a novel means for operating an automobile starter switch so that the starter motor associated with the automobile cannot be operated to move the car through the use of the starter motor.

Another object is to provide novel means for operating an automobile starter switch so that the starter switch may be easily and quickly operated by the operator of the motor vehicle without requiring the use of the feet, thereby leaving the feet free to manipulate the brake or other foot controls.

Another object is to provide novel means whereby a sidewise movement of the gear shift lever of a motion transmission means when in neutral position will operate to close the circuit to the self starter motor of an automobile.

A still further object is to provide novel means whereby a starter switch of an automobile can only be operated when the gear shift lever of a motion transmission means is positively in neutral position.

The invention is broadly new, basic and pioneer in that I so combine a starter switch for the self starter of an automobile with the transmission means of the automobile so as to enable the starter switch to be closed by the operative end of a gear shift lever and by a sidewise movement of the gear shift lever when in neutral position, and in preventing operation or closing of the starter switch when the gear shift lever is even the least bit forward or backward of true neutral position.

The invention includes the parts and combinations of parts more particularly hereinafter described and claimed.

Other objects, advantages and features of invention may appear from the accompanying drawing, the subjoined detail description and the appended claims.

The accompanying drawing illustrates the invention in a form I at present deem preferable.

Figure 1 is a side elevational view of an automobile transmission section, and illustrating more or less diagrammatically an automobile power plant and the starter motor circuit. Parts are broken away to contract the view.

Fig. 2 is an enlarged transverse sectional view taken on line 2—2, Fig. 1 and looking in the direction of the arrows.

Fig. 3 is an enlarged fragmental sectional view in plan, taken on irregular line 3—3, Fig. 2, and looking in the direction of the arrows.

Referring to Fig. 1 an engine is indicated at 10, a transmission housing at 12, a universal joint at 13, a drive shaft at 14, a gear shift lever 15 is shown above the transmission housing 12, the starter switch 16 is shown supported by the transmission housing 12, an electric circuit is indicated at 17, having a battery 18, and a starter motor 19 to start the engine 10; the electrical circuit 17 is shown grounded at 20 and 21 which may be to the frame of the vehicle, not shown, or other convenient parts of the vehicle.

Referring to Fig. 2, a sectional view, the recited gear shift lever 15 is shown pivoted by a ball joint 22 in an upper housing 23 secured to the recited transmission housing 12, as by bolts 24.

The gear shift lever 15 extends below the ball joint 22 and is provided with the spring 25 working against the movable collar 26 which bears against the housing 23 and tends to maintain the lever 15 in a central position.

The lower end of the lever 15 is fitted with the ball 27 which contacts the gear shifting members and operates the switch 16.

The gear shifting members comprise the stationary guide bars 28 and 29 secured in the housing 12, and the shifting bars 30 and 31 slidably mounted on the guide bars 28 and 29. As shown the bar 29 extends downwardly to engage the sliding gear 32 which is mounted on the driven shaft 33 leading to the recited universal joint 13. The transmission also includes the low gear 34 and the reverse idler gear 35.

The shifting bars 30 and 31 are recessed to form the rectangular slot 36 for the accommodation of the ball 27. The slot 36 extends into the bar 30 a sufficient distance to provide room for the head 37 of the switch operating plunger 38 which is substantially flat and is adapted to slide sideways in the slot 39 in guide bar 29 provided for that purpose.

Plunger 38 is supported in bar 30 in the opening 40, in which it operates and which also houses the tension spring 41, access to which is had by means of the screw cap 42 adapted to be screwed on the threaded portion 43 of the bar 30.

Plunger 38 further extends toward the switch 16 by means of the bolt 44 screwed therein and which extends through the spring 41 and through the cap 42 and is provided with the pointed contacting member 45 which is screwed thereon.

The spring 41 residing in the opening 40 tends to yieldingly support the plunger 38 and its connected parts toward the ball 27, the movement in this direction being limited by the seating of the contacting member 45 against the screw cap 42, and movement in the opposite direction being limited by the seating of the head 37 against the bar 30.

The switch 16 comprises a supporting member 46 which is secured to the housing 23 by means of the screws 47, and by means of threaded portions supports the insulated switch casing 48 having a cover 49 screwed thereon.

Two spring contact switch members 50 are secured to the inside of insulated casing 48 by means of screws 51 to which are connected wires 52 which form part of the recited electrical circuit 17.

An insulated plunger 53 operates between the switch members 50 normally insulating them one from the other; but upon movement of the plunger 38 the plunger 53 is moved longitudinally to bring between the switch members 50 a metallic ring 54 mounted thereon thereby connecting the switch members 50 and completing the circuit 17.

The supporting member 46 is formed with a central cylindrical offset 55 forming therein a recess 56 adapted to house a spring 57. The plunger 53 passes through the offset 55, through the spring 57, through the housing 23 and has secured to the end thereof a contact member 58 similar to the opposed contact member 45. The spring 57 is tensioned between the contact member 58 and the inside of the offset 55 and tends to push the plunger 53 toward the opposing plunger 38 and normally seats the insulating plunger 53 against the offset 55 thus limiting the movement in one direction. The cover 49 is formed with a guideway 59 for the end 60 of the plunger 53.

In operation, assuming that the several parts are properly assembled, and that they are in normal position, which is disclosed in Figs. 2 and 3, the gear shift lever 15 would then be in neutral position, with no gears in mesh.

The plunger 38 is in normal position with the head 37 projecting into the slot 36 a sufficient distance to permit its movement by the ball 27 that the contacting member 45 will contact and move the contacting member 58 and consequently the plunger 53 that the metal ring 54 will be moved between the switch members and electrically connect them, thus completing the electrical starter circuit 17.

Assuming that the operator of the vehicle is seated at the left with the gear shift lever at his right, and the starter switch secured to the transmission housing on the right side, to operate the starter switch the operator moves the gear shift lever 15 towards him or to the left, thus swinging the lower end of the lever 15 below the ball joint 22 to the right.

This movement of the lever 15 moves the ball 27 over against the plunger head 37 and presses it back against spring 41, moving the plunger 38 and the contact point 45; being in neutral position the bar 30 rests with the contact member 45 opposite contact member 58 on the switch plunger 53, and the contact member 53 is thereupon contacted and moved together with the plunger 53 and the contact ring 54, thereby closing the switch.

Upon the release of the shift lever 15 it will return to its central normal position under influence of the spring 25, the plungers 38 and 53 will return to normal position under the influence of their respective springs. The spring 41 on the plunger 38 is substantially larger and heavier than spring 57 on plunger 53, for the purpose of providing resistance to the head 37 which may be contacted more or less severely during the ordinary shifting of the gears of the car, and must therefore present sufficient resistance to contact by the gear shift lever ball 27 as not to operate to move the switch 16 unless specific predetermined pressure is applied to gear shift lever 15 for that particular purpose.

Assuming that the transmission incorporates what is commonly known as the standard gear shift in which low gear position of the gear shift handle is to the left and rear, upon starting the engine by this method the gear shift handle is directly in front of the low position and can be dropped back into that position with the least amount of manipulation. The same holds for the reverse position which is directly forward.

When the gear shift lever 15 is moved to either low or reverse position the bar 30 is consequently moved and carries with it plunger 38 which is mounted therein together with contact member 45 which is thus moved out of line of contact with contact member 58, and thereby renders the relation of the switch operating parts such that no contact can be made to the switch 16, and it will be seen that it is impossible to operate the starter switch 16 to start the engine when the gears are in other than a neutral position.

The moving of the gear shift lever 15 into second and high gear positions removes the ball 27 from any possibility of contact with the switch operating mechanism.

Certain modifications will become apparent to one versed in the art in adapting my invention to use with the different models of engines in use, but such modifications may well be made without departing from the spirit of the invention as defined in the appended claims.

I claim:

1. A safety device comprising in combination a gear shift lever and electrical contacts, said contacts being brought into engagement by a movement other than for gear shifting purposes of said shift lever when in neutral position.

2. A safety device including in combination a gear shift lever and adapted to be operated to close an electrical circuit by a movement of said gear shift lever when in neutral position, said movement being other than for gear shifting purposes.

3. In a safety device a switch actuating mechanism; a gear shift lever; said gear shift lever being adapted to operate said actuating mechanism to close the switch by movement of said gear shift lever other than for gear shifting purposes when said lever is in neutral position.

4. In a safety device a switch actuating mechanism; a gear shift lever; said gear shift lever being adapted to shift said actuating mechanism in and out of a contact zone with said switch and to actuate said actuating mechanism to close said switch when said actuating mechanism is in the contact zone by a movement of said shift lever other than for gear shifting purposes.

5. A safety device comprising a switch; switch actuating mechanism normally in a switch actuating zone; a gear shift lever adapted to be moved into a neutral position; said switch actuating mechanism adapted to be moved by said gear shift lever out of the normal position when the lever is shifted to a gear engaging position, and said gear shift lever adapted to be moved independently to a gear shifted position away from said switch actuating mechanism; said gear shift lever adapted to actuate said switch actuating mechanism to close said switch by a movement of said lever other than for gear shifting purposes when said lever is in neutral position.

6. A safety device comprising in combination with a gear shift lever of a motion transmission means, a switch; a switch element in said switch adapted to be moved to close a connected electric circuit; a spring tensioned element carried by a gear shifting element of said motion transmission means and movable to actuate said switch; said gear shift lever being adapted to engage and move said gear shifting element into and out of gear engaging position and to a neutral position; said gear shift lever being adapted to operate said spring tensioned element by a movement other than for gear shifting purposes to actuate the switch element in said switch to close the circuit when said gear shift lever is in neutral position.

7. A safety device comprising in combination a switch; a gear shift lever; means operable by said gear shift lever to actuate said switch when said lever is in neutral position and by a movement other than for gear shifting purposes.

8. A safety device comprising in combination a switch; actuating elements adapted to be operated to move said switch; an electric circuit including said switch; a starter motor in said circuit; and a source of electrical energy in said circuit; a gear shift lever adapted to be moved in a direction other than for gear shifting purposes when in a neutral position to operate said actuating elements to actuate said switch to close said circuit and operate said starter motor.

9. A safety device comprising in combination a supporting member adapted to be secured to a transmission housing; an insulated switch casing supported by said supporting member; spring switch members supported by said casing; a cap member closing the end of said casing, a plunger extending through said cap member, said casing and said transmission housing; a gear shift lever; means operable by a movement of said lever to move said plunger to form a contact between said switch members to operate a connected starter motor when said lever is in neutral position.

10. A safety device comprising in combination a switch; a spring tensioned plunger in said switch; a substantially pointed contact member on said plunger; a spring tensioned switch actuating plunger; a substantially pointed contact member on said actuating plunger, both said contact members normally opposed in a contact zone; a gear shift lever adapted to move one of said contact members out of the contact zone when said gear shift lever is moved to shift certain gears; said gear shift lever positioning said contact member in the contact zone when said lever is in neutral, and said lever being adapted to actuate one of said contact members to contact the opposing contact member when in said contact zone to actuate said switch by means of a movement of the said lever while in neutral for other than gear shifting purposes.

11. A safety device comprising in combination a switch, means in said switch to close an electrical circuit; means to actuate said switch to open said circuit; means normally resting in a contact zone adapted to be operated to close said switch, and means to operate said last named means when in said contact zone including a gear shift lever adapted to be moved to operate said switch when moved in a direction other than for gear shifting purposes.

S JACK HELLMAN.